United States Patent [19]

Schaller

[11] Patent Number: 4,666,019
[45] Date of Patent: May 19, 1987

[54] DEVICE FOR MONITORING LUBRICATION IN LARGE DIESEL ENGINES

[75] Inventor: Werner Schaller, Blieskastel, Fed. Rep. of Germany

[73] Assignee: Schaller-Automation Industrielle Automationstechnik KG, Blieskastel, Fed. Rep. of Germany

[21] Appl. No.: 779,795

[22] Filed: Sep. 24, 1985

[30] Foreign Application Priority Data

Sep. 24, 1984 [DE] Fed. Rep. of Germany ....... 3434955

[51] Int. Cl.⁴ ............................................. F01M 11/10
[52] U.S. Cl. ...................................... 184/6.4; 184/108; 174/47; 174/97; 339/16 R
[58] Field of Search ................. 184/6.4, 108; 174/47, 174/97; 339/15, 16 R, 16 C, 16 RC; 340/627, 631; 123/196 S; 250/564, 573

[56] References Cited

U.S. PATENT DOCUMENTS

| 2,402,781 | 6/1946 | Schreiber | 174/47 |
| 2,480,803 | 8/1949 | Wreford | 174/47 |
| 2,776,385 | 1/1957 | Modrey | 174/47 |
| 3,143,641 | 8/1964 | Wise | 174/47 X |
| 3,587,079 | 6/1971 | Obergefell et al. | 184/6.4 X |
| 4,156,795 | 5/1979 | Lacan | 174/97 |
| 4,347,998 | 9/1982 | Loree | 174/97 X |
| 4,475,382 | 10/1984 | Frank | 340/627 |
| 4,503,806 | 3/1985 | Prusak et al. | 184/6.4 |

OTHER PUBLICATIONS

IBM Technical Disclosure Bulletin, vol. 21, No. 6, Nov. 1978.

Primary Examiner—Leonard E. Smith
Attorney, Agent, or Firm—Michael J. Striker

[57] ABSTRACT

A lubrication monitoring device for heavy duty diesel engines includes a plurality of measuring receivers connected at one level to driving spaces of the engine. Each receiver is assembled of a socket part secured to the wall of the engine and enclosing a lower and upper padding of resilient material pressed together by a pressure plate fastened to the top of the socket. Opposite lateral walls of the socket are formed with cutouts for receiving a ribbon cable which is integral with lateral elongated channels connected respectively to an underpressure and overpressure pump. The upper padding is provided with a connector block carrying a plurality of fork shaped contacts and with two hollow connection pieces which upon compression of the upper padding penetrate the elastic material around the elongated channels while the fork shaped contacts penetrate the insulation of the cable wires. A housing part of the receiver is hinged to the socket and is secured thereto by a central fastening screw which is provided with an axial passage forming a nozzle communicating with a testing channel in the housing attachment and opening into a feeding channel leading to the driving spaces in the engine. The housing attachment supports a plurality of uniform modular units with electrical circuitry for a light barrier in the testing channel. The modular units are connected by contact strips which upon fastening the housing attachment to the socket are pressed against a set of spring biased flat contacts connected via the fork shaped contacts to the cable wires.

18 Claims, 9 Drawing Figures

DEVICE FOR MONITORING LUBRICATION IN LARGE DIESEL ENGINES

BACKGROUND OF THE INVENTION

The present invention relates to a device for monitoring lubrication of large diesel engines or other engines having large pistons in a plurality of driving spaces. The monitoring device is of the type which includes measuring receiver connected to one or more driving spaces to suck oil mist from the latter into a test channel where a li9ht barrier senses the concentration of the oil mist and generates electrical signals proportional to the measured concentration. The electrical signals from all measuring receivers are supplied via a common multiple conductor cable to a central electrical evaluation unit provided with control means which in the case of an excessive concentration of the oil mist detected in at least one measuring receiver generates an alarm signal which throttles or turns off the corresponding engine. The suction of the oil mist into the test channels of respective receivers is performed by a central vacuum pump connected to the receivers by a common underpressure conduit.

Lubrication monitoring devices of this kind are employed mostly on heavy duty diesel engines on vessels in order to prevent damages or explosions in the driving spaces due to malfunction in lubricating systems. Such damages may occur for example in the case when the lubricating film between the sliding surfaces is interrupted and excessive heat developed due to dry friction increases temperature of lubricating oil around the disrupted location to such an extent that the oil evaporates. The oil vapors condense in the lower temperature atmosphere of the driving space in an oil mist whose increasing concentration serves as an indicator in the monitoring device for detecting the beginning of a lubrication damage.

In the prior art oil mist monitoring devices the suction conduits communicating with respective sections of driving spaces of the monitored engine open in the same test channel of the monitoring device provided with the light barrier. In operation, it was necessary to control the feeding of the oil mist from respective sections of the driving spaces one after the other by means of valves and the concentration was consecutively measured in the test channel. Due to the time delay caused by the suction of the oil mist through relatively long suction pipes and time delays due to the sequential interrogation of respective driving spaces, the prior art devices cannot guarantee a timely detection of lubrication failure. This uncertainty is caused particularly due to the fact that all driving space sections of the engine generate also oil mist resulting from spraying of the oil by centrifugal effect of moving parts and are also vaporized in hot regions of the driving spaces during the normal operation whereby continuously a basic oil concentration in the sucked out gas is present. This basic concentration impairs the detection of the additional oil mist concentration generated at the beginning of a lubrication failure. It is necessary therefore to detect as fast as possible the start of a lubrication failure but on the other hand, false alarms which may result due to normal operational situations of the basic oil mist concentration must be under all circumstances avoided inasmuch as an unnecessary inactivation of a drive of a ship might lead to unnecessary hazardous conditions. Moreover, due to long suction pipes the precipitation of oil in lower bends of the pipe cannot be avoided. Such oil depositions reduce the oil mist concentration and may even plug the suction pipes.

In order to improve the oil mist measuring method applicant has already proposed a measuring arrangement in which a separate measuring receiver is assigned to each section of the driving space of the engine and a central electric evaluation unit electrically connected to the receiver. In this manner all driving spaces are simultaneously monitored without any time delay and are immediately compared one with each other in the evaluation unit. Nevertheless, the disadvantage of this arrangement is its relatively complex design requiring the provision of individual installation plans and also the service and maintenance has required highly skilled electrical and mechanical workers and high installation and maintenance expenditures.

SUMMARY OF THE INVENTION

It is therefore a general object of the present invention to overcome the aforementioned disadvantages.

More particularly, it is an object of this invention to provide an improved lubrication monitoring device of this kind which can be readily installed to a diesel engine in a very simple way and which is reliable in operation.

Another object of this invention is to provide such an improved monitoring device which can be installed and maintained even by non-skilled workers so that the installation and maintenance cost is considerably reduced.

In keeping with these objects and others which will become apparent hereinafter, one feature of this invention resides, in a device for monitoring lubrication in driving spaces of a large diesel engine, in a combination which comprises a plurality of measuring receivers each having a test channel provided with a light barrier for generating electrical signals indicative of oil mist concentration, suction conduits arranged at one level along said engine and communicating with the driving spaces to feed oil mist from the latter into the measuring receivers, a common electrical evaluation unit connected to the receivers via a profiled multiple conductor cable to generate a control signal for the engine when the electrical signals indicate a lubrication failure, the profiled multiple conductor cable being of elastic material defining a flat ribbon-like intermediate part embedding a set of conductor and two lateral hollow expansions integral with the intermediate part and each enclosing an elongated channel extending in the plane of the conductors and leading to a vacuum pump, each of the measuring receivers including a socket formed with lateral side openings for receiving the profiled multiple conductor cable and with second openings for receiving the suction conduits, a lower and an upper padding of elastic material arranged in the socket and formed with a connection channel communicating with the second openings, the lower padding enclosing a portion of the cable and the upper padding enclosing a connector block, the connector block being provided with contacts for engaging the set of conductors and with hollow connection pieces communicating with hollow expansions, a housing part detachably secured to the socket opposite the upper padding, the housing part including the test channels, a nozzle connecting the test channels with the connection channel, the light barrier, a suction passage communicating with the test channel and opening opposite the hollow connection pieces, and means for electrically connecting the light barrier to the connector block.

By virtue of the integration of the sets of electrical conductors with the elongated channels leading to vacuum pump in a single profiled cable of elastic material in which the elongated channels and the conductors are arranged in a single plane, it is made possible to quickly install the profiled multiple conductor cable in the plane of the suction conduit leading into the engine, in a simple operational step. The prior art installation of individually cut pipes and the complicated wiring between the measuring receivers and evaluation unit is eliminated. Since the profiled flat ribbon cable includes all electrical conductors in combination with suction conduits and high pressure conduits for cleaning air arranged in a single plane, it suffice to pass the flat ribbon cable through the openings in the socket of each measuring receiver where, upon the fastening of the housing part, all electrical and pneumatical connections are immediately established. In this manner, separate fastening elements can be dispensed with and by clamping the profiled flat ribbon cable between the elastic paddings in the receiver socket there results a suspension of the conduits and conductors which due to the elasticity of the paddings damps the vibrations of the engine.

In the preferred embodiment of this invention, the connector block embedded in the upper padding is provided with fork like contact elements which upon pressing of the upper and lower paddings against each other pierce the insulating material to establish immediately a connection with the electrical wires and the housing part. Since the electrical wires together with the elongated channels lie in the same plane in the profiled flat cable, the electrical contact and the hollow connection pieces penetrate simultaneously through the elastic material of the cable without the need of any complicated work. The composition of the elastic material is such as to enable an easy penetration of the pneumatic and electric contacts through the walls of the hollow expansions and through the insulating layers of the wires.

By virtue of the combined arrangement of the elongated channels in the flat cables, and by clamping portions of this cable in the socket of the measuring receiver in such a manner that upon screwing of the housing part to the socket of the receiver all electrical and pneumatical connections between the profiled flat cable and the corresponding measuring receivers are automatically established, the installation and maintenance work is reduced to a few simple manipulations which can be performed by workers without any specialized skill. After screwing the socket of the measuring receiver to the wall of the driving spaces of the engine all what is needed is to press the profiled flat cable in the lower padding in the socket, to apply the housing part with the upper padding and screw the housing part to the socket, whereupon all connection and installation work of the measuring receiver is finished. By a simple connection of the electrical wires to the central evaluation unit and of the elongated channels to a vacuum pump, the entire installation is completed and ready for operation.

Preferably, the electrical contacts in the connector block are in the form of forks and the connection pieces for the elongated channels are in the form of hollow pins provided with inclined piercing surface so as to improve the penetration, thus insuring a fast and reliable connection. The inclined tip of the hollow connection pieces start penetrating the hollow expansions even after application of a low pressure at which the edges of the fork like electrical connectors penetrate the coating of the wires.

In another preferred embodiment of this invention, the section of the profiled flat cable between individual measuring receivers are protected by a profiled metal casing which apart from its reinforcing function provides simultaneously an electric shield against outer interferences.

The bottom of the intermediate ribbon like cable portion is preferably provided with a snap lock which upon insertion of the flat cable in the metal protective sheath or casing automatically snap engages a corresponding catch in the casing and establishes a vibration resistant mount of the cable in the casing and a seal against lower and upper parts of the latter.

The metal profiled casing or sheathing of the flat cable projects in the lateral openings in the sockets of two measuring receivers. In this manner, the metal sheathing is supported by the sockets and upon fastening of the housing parts of the receiver the ends of the metal casing or sheathing are clamped between the elastic lower and upper pads. In this manner the suspension of the metal sheathing is also elastically held against vibrations and simultaneously provides a permanent sealing connection between the metal casing and the interior of the socket.

The rear side of the connecting box is provided with open connection channels which are easy to manufacture and during maintenance work any contaminating particles can be easily removed just by lifting the upper elastic padding. The fork like contact elements are interconnected with a flat contact strip on the rear side of the connector block. The contact strip upon compression of the two paddings in the receiver is pressed against a corresponding opposite contact strip in the upper padding and automatically establishes an electrical connection for all electrical signals.

Since the upper padding in the receiver is provided with throughgoing channels opening into the connection channels in the connector block which leads to the feeding channel, and since all these channels on screwing the parts of the measuring receiver together are automatically brought in tight communication, the installation of the monitoring device is made possible in the simplest way by means of a modular system.

The modular units of the system are connected to the connector block and to each other by a flexible tongue leading from the flat contact strip in the upper padding to a resilient flat contact member by means of which a conductive connection to electronic circuits in respective modular units in the housing attachment is established. At the same time, the flat contact strips are provided on facing surfaces of all modular units and are pressed tightly one against the other. In this manner, only by bolting the housing parts to the socket all contacts are automatically and simultaneously established. The spring bias of the flat resilient contact body guarantees the requisite continuous contact pressure. The subdivision of the electric circuitry of the device in several partial modules of parallelopiped configuration it is made possible that even an unskilled worker can assemble the desired functional circuit by a combination of different modules of equal size so as to achieve the desired final function. The individual modular units in the system can be also easily exchanged if desired.

Preferably the circuit of the measuring receiver is made of aluminum and covered by a pressure plate provided with openings for passing through the contacting elements. The pressure plate separates the lower and upper paddings and upon pressing the receiver parts together, it prevents bulging overflow of the padding material and contributes to the sealing enclosure of the protective casing of profiled metal.

With advantage, the pressure plate is secured to the socket part independently from the fasteners of the housing part. In this manner, a fixed clamping connection between the profiled metal casing and the socket part is produced before the housing part is attached. The separate fastening of the pressure plate also facilitates the exchange of modular units or other parts in the housing attachment or the exchange of the housing attachment itself, without releasing the clamping pressure in the socket part. The opening for the resilient flat contact body passing through the pressure plate is located opposite the contact strips in respective modular units in the housing parts.

The measuring receiver is provided with a bottom connection piece and with lateral connection pieces connectable to suction conduits. The bottom connection piece leads to driving spaces of the engine to suck oil mist into test channels and the lateral openings provide a connection to the vacuum pump. The lateral openings which are not in use can be simply closed by a plug.

The lower and upper paddings in the measuring receiver are preferably shaped with recesses provided with sealing lips which insure a gas tight engagement with metal casing and the suction conduits by increasing the specific pressure on the points of contact of the sealing lips.

The oil mist from the suction conduits is supplied into the test channel through a nozzle which during the fastening of the housing attachment to the socket passes through a corresponding opening in the pressure plates and provides a gast tight connection therewith. By means of the supply nozzle at the beginning of the test channel, the pressure conditions in the entire system can be accurately adjusted simply by the selection of a suitable size of the nozzle.

In the preferred embodiment of this invention, the housing attachment is hinged to the socket part by means of a hook-shaped hinge arranged at one edge of the housing part whereby the contact strips in the lower and upper paddings are arranged in close proximity to the hinge axis whereas the nozzle and the fastening screws are arranged at the opposite side. By this arrangement upon swinging the housing part into its closing position a leverage increases pressure at the facing contact strips so that manual closing force is amplified to such an extent that the strongly biased spring of the flat contact body can be manually brought into its compressed position.

The fastening screw for the housing attachment extends along the center axis of the test channel to engage an inner thread in the socket part and the fastening screw is provided with an axial passage forming the supply nozzle for the oil mist. In this manner, the fastening screw can be made substantially shorter than the length of the test channel and at the same time enables an easy exchange of the supply nozzle.

One of the lateral elongated channels in the profiled flat cable is with advantage used for the supply of pressure air which acts as rinsing medium during the zero point adjustment of the light barrier. The zero point adjustment is performed in order to correct measuring errors resulting from the zero point shift occurring after a prolonged period of operation.

The modular construction of the device of this invention is applicable for a simultaneous monitoring of several engines of the same or different design by using a single central evaluation unit which is connected to profiled flat cables installed at respective engines by means of a terminal box. Each terminal box is preferably of the same design as the socket and housing part of the measuring receiver. Only the housing part, instead of electrical circuit modules, light barrier and test channels, includes terminal modules for the electrical conduits leading to the central evaluation unit and also connection modules for the over or underpressure pump. In this manner it is possible to connect an arbitrary number of measuring receivers to a corresponding number of suction outlets of the driving spaces of the engines without changing the combination of the modular units.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
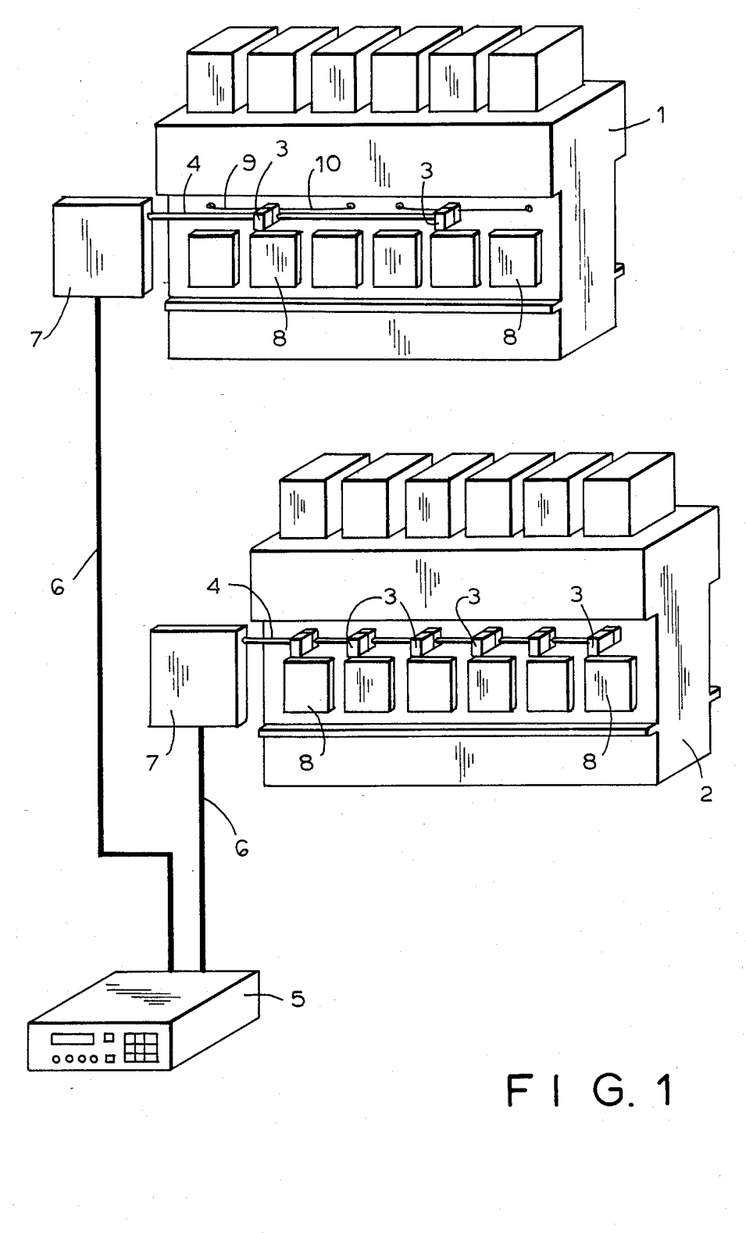
FIG. 1 shows schematically a perspective view of an embodiment of this invention for monitoring driving spaces of two engines each provided with a different arrangement of the measuring receivers.

The layout of the monitoring device of this invention illustrated in FIG. 1 includes a plurality of measuring receivers 3 connected to driving spaces 8 of two piston engines 1 and 2. The measuring receivers at each engine are connected either directly to suction openings leading into the driving spaces 8 (engine 2) or one measuring receiver 3 is connected to several suction openings by suction tubes 9 and 10 (engine 1). The suction openings at each engine are arranged at the same level. The measuring receivers 3 are electrically interconnected by a profiled multiconductor cable protected by a profiled casing or sheathing 4 of metal. The sheathing 4 with the inserted cable extends substantially at the same level as the suction openings and the cable is connected via terminal boxes 7 and long distance lines 6 to a central evaluation unit 5 which in response to electrical signals received from the measuring receiver 3 controls the operation of respective engines 1 and 2. In this example engine 2 has six driving spaces or sections 8 each communicating with a measuring receiver 3 whereas engine 1 has only three measuring receivers 3 assigned to the six driving spaces 8. The measuring receivers 3 at the engine 2 are connected to the suction openings leading into the driving spaces 8 by a bottom connection piece, each of the two measuring receivers at the engine 1 is connected to one driving space 8 through its bottom connection piece and to adjoining driving spaces by two lateral suction conduits 9 and 10, as mentioned above.

Figure 2:
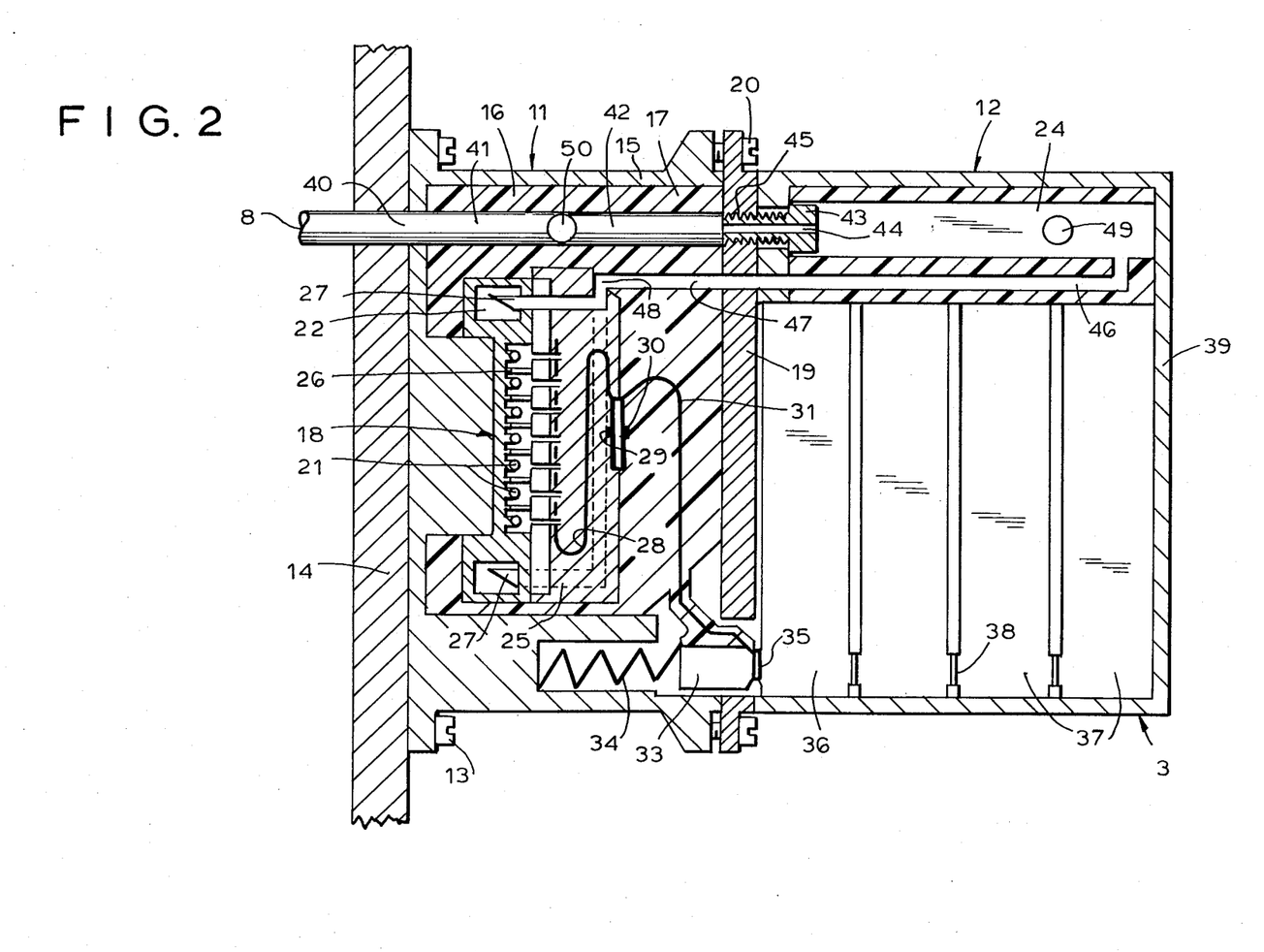
FIG. 2 is a sectional side view of a simplified version of a measuring receiver, including a socket part and a housing part.

The measuring receiver 3, shown in cross-section in FIG. 2 is assembled of a socket 11 and a housing attachment 12. The socket 11 is fastened by means of screws 13 to the wall 14 of a driving space of an engine and is formed by an aluminum box 15 open at its top. The supporting box 15 houses a lower elastic padding or tray 16 and an upper elastic padding or tray 17. Opposite lateral walls of the supporting box 15 are provided with openings for receiving a profiled flat cable 18 whose construction will be described below. The profiled flat cable 18 passes between the elastic lower and upper padding 16 and 17 and upon screwing an aluminum pressure plate 19 on top of the supporting box 15, the profiled flat cable is firmly but resiliently clamped in a fixed position between the two paddings. The fastening of the pressure plate 19 is made by screws 20. The profiled flat cable 18 includes a ribbon like intermediate part of elastic material embedding a set of wires 21 arranged in one plane, and two lateral hollow expansions of the same elastic material integral with the intermediate flat portion. Each expansion encloses a channel designated by reference numerals 22 and 23. The elongated channel 22 serves as a suction or underpressure channel for sucking oil mist from a driving space 8 into the test channel 24. The other elongated channel 23 acts as an additional overpressure conduit for feeding high pressure rinsing air in the testing channel 24.

A connector block 25 is embedded in a face of the upper elastic padding 17 opposite the lower padding. The side of the connector block 25 facing the profiled flat connector 18 is provided with fork like connector elements 26 for snap engaging the electrical wires 21, and with tubular connection pins 27 serving as connection pieces for the two elongated channels 22 and 23. In screwing the pressure plate 19 on top of the supporting box 15 the bifurcated tips of the contact elements 26 penetrate the insulation of the wires 21 in the ribbon like intermediate part whereas the hollow pins 27 penetrate the walls of the hollow expansions defining the longitudinal channels 22 and 23. In this manner, an instant electrical and pneumatical connection is established immediately upon fastening of the pressure plate 19.

The individual fork like contact elements 26 are connected via flexible conductive forks 28 embedded in the connector block 25 to a contact strip 29 provided at the rear side of the connector block 25. The contact strip 29 cooperates with an opposite contact strip 30 in the upper padding 17 so that upon screwing the pressure plate 19 to the socket box 15 the two contact strips 29 and 30 are firmly pressed one against the other. The contacts in the opposite contact strip 30 are connected via conductive foils 31 passing through movable tongue 32 at a lateral side of the upper padding 17, with contact members 33 which are spring biased by springs 34 against an opening in the pressure plate 19 located opposite contact strip 35 of the first modular unit 36 arranged in the housing attachment 12. The remaining modular units 37 in the housing attachment, also provided with corresponding contact strips 38 which upon fastening of the housing attachment to the socket part 11 are pressed one against the other and against the spring biased contact members 33. The last modular unit 37 is pressed against the end wall 39 of the housing attachment 12.

Oil mist in driving space 8 of the engine is sucked through connection 40 at the bottom wall of the socket 11. The connection 40 communicates via feeding channels 41 and 42 in the upper and lower paddings 16 and 17 with an opening in the pressure plate 19 situated opposite the testing channel 24 in the housing attachment 12. The inlet opening of the testing channel 24 supports a fastening screw 43 engaging an inner thread in the opening of the pressure plate 19. The fastening screw 43 is formed with an axial through bore 44 aligned with the central axes of the channels 41, 42 and 24 and acting as an inlet nozzle through which the oil mist is supplied into testing channel 24. The threaded opening in the pressure plate 19 is designated by reference numeral 45. The suction of the oil mist through the testing channel 24 is performed by means of suction channels 46, 47 and 48 formed respectively in the housing part 12, the upper padding 17 and the connector block 25. The suction channel 46 communicates with the outlet end of the channel 24 and with a corresponding opening in the pressure plate 19. The suction channels 47 and 48 communicate with the latter opening in the pressure plate and a hollow pin 27 projecting from the front surface of the connector block 25 against at last one of the channels 22 or 23 in the hollow extensions of the profiled cable 18. The elongated channel 22 is connected to a non-illustrated vacuum pump.

The oil mist in the testing channel 24 is moved past the light barrier 49 which converts the concentration of the oil mist into corresponding electrical signals. Lateral openings in the socket box 15 lead through transverse channels 50 into the feeding conduits 41 and 42. The lateral openings serve for connection of the lateral suction pipes 9 and 10.

Figure 3:
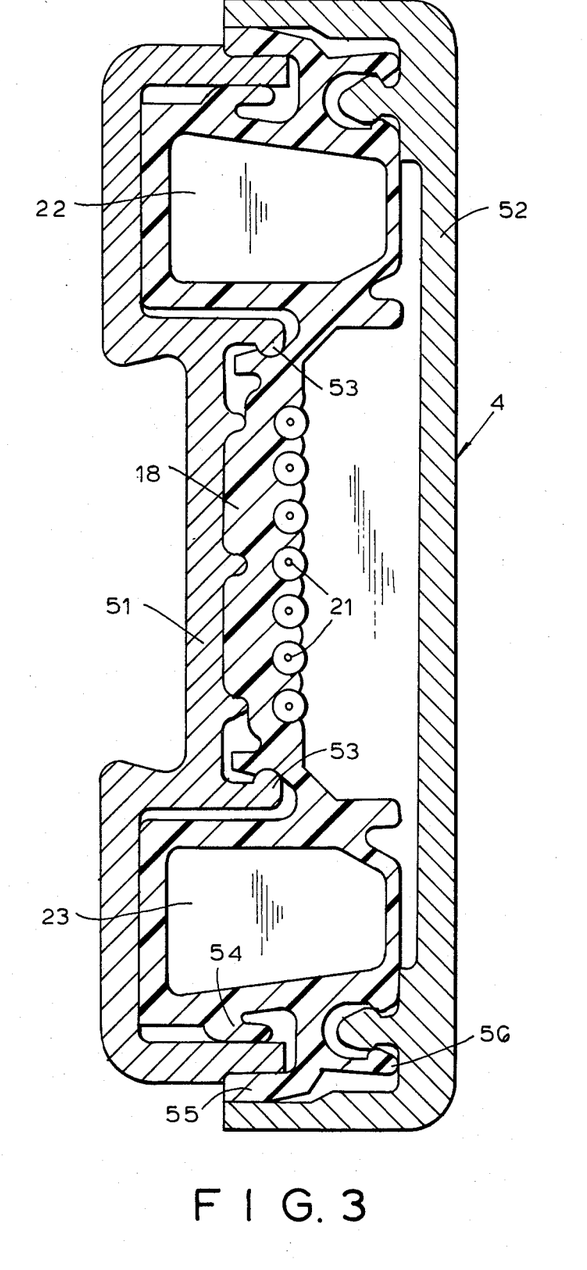
FIG. 3 is a transverse section of a metal profiled sheathing or casing with inserted profiled flat cable, shown on an enlarged scale.

The sheathed profiled multiconductor cable used in the device of this invention is illustrated in transverse cross-section in FIG. 3. The profiled metal casing 4 consists of an aluminum bottom part 51 and an aluminum cover part 52. The profiled flat cable 18 in the casing 4 is made of an elastic material and defines an intermediate ribbon like portion embedding insulated electric wires 21. The lateral sides of the intermediate portion are integral with hollow expansions enclosing longitudinal channels 22 and 23. The inner surfaces of the metal casing or sheathing 4 are formed with locking projections which snap engage corresponding locking or clamping projections 53 and 56 on the outer surface of cable 18. In addition, the outer surface of cable 18 is provided with inner sealing lips 54 and outer sealing lips 55 which sealingly enclose the rim of the bottom part 51 of the metal casing and in cooperation with the clamping lips 56 resiliently hold the cover part 52 in position so that the latter is damped against vibrations.

Figures 4, 5:
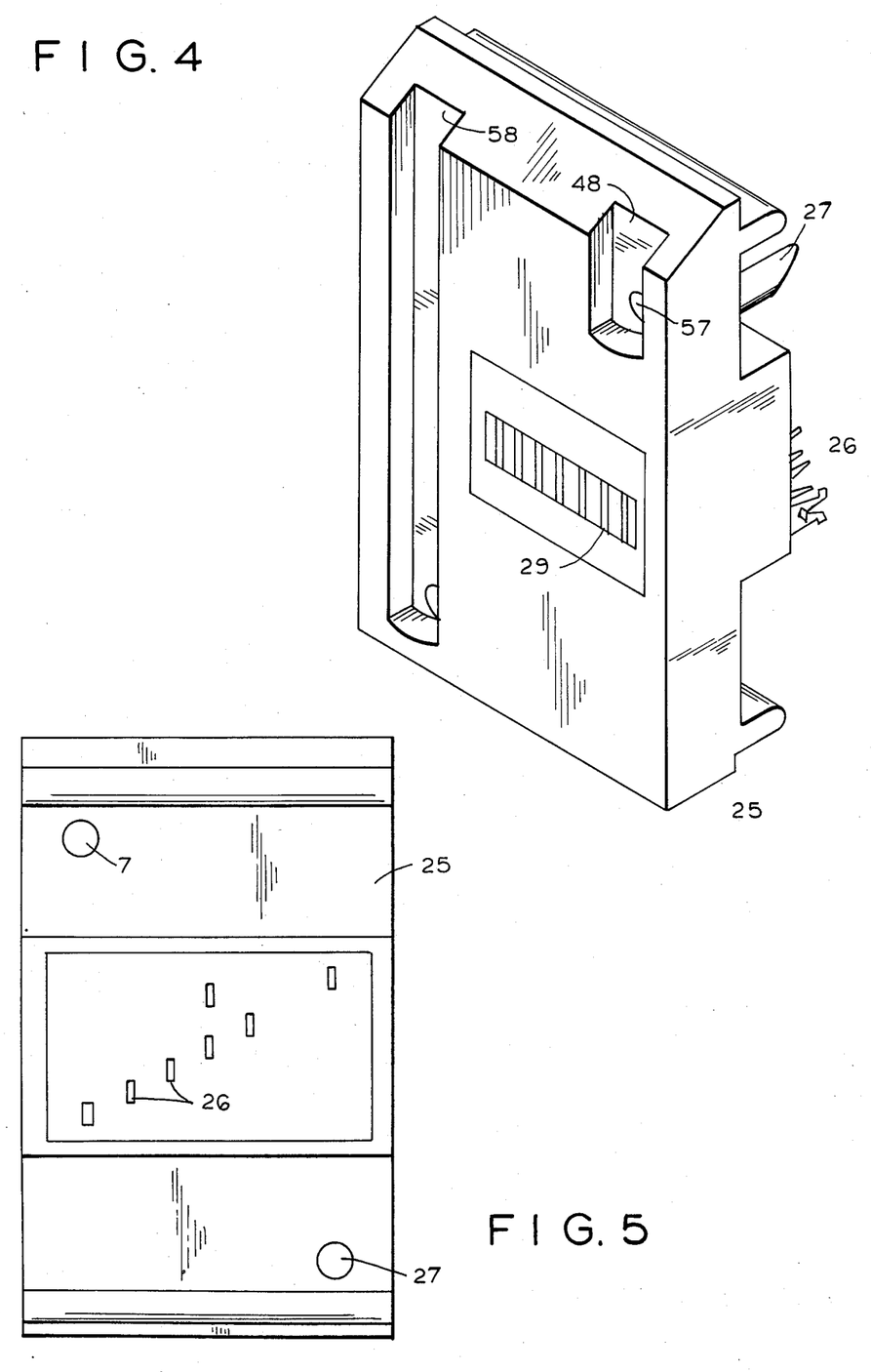
FIG. 4 is a perspective of a connector block in a measuring receiver.
FIG. 5 is a plan view of the connector block of FIG. 4 with connection elements for engaging the profiled flat cable in the receiver.

FIGS. 4 and 5 illustrate in detail the configuration of the connector block 25 and the arrangement of hollow pins 27 for establishing the pneumatic connection with the elongated channels 22 and 23 in the profiled cable 18, and of fork shaped contacts 26 for establishing electrical connections with the wires 21. The rear side of the connector block 25 is provided with the beforedescribed contact strip 29 and is formed with recesses constituting the connection channel 48 for the underpressure or suction passage communicating with the inlet 57 of the hollow pin 27. Another recess 58 constitutes the overpressure connection passage communicating via the other hollow pin 27 with the elongated overpressure channel 23.

Figure 6:
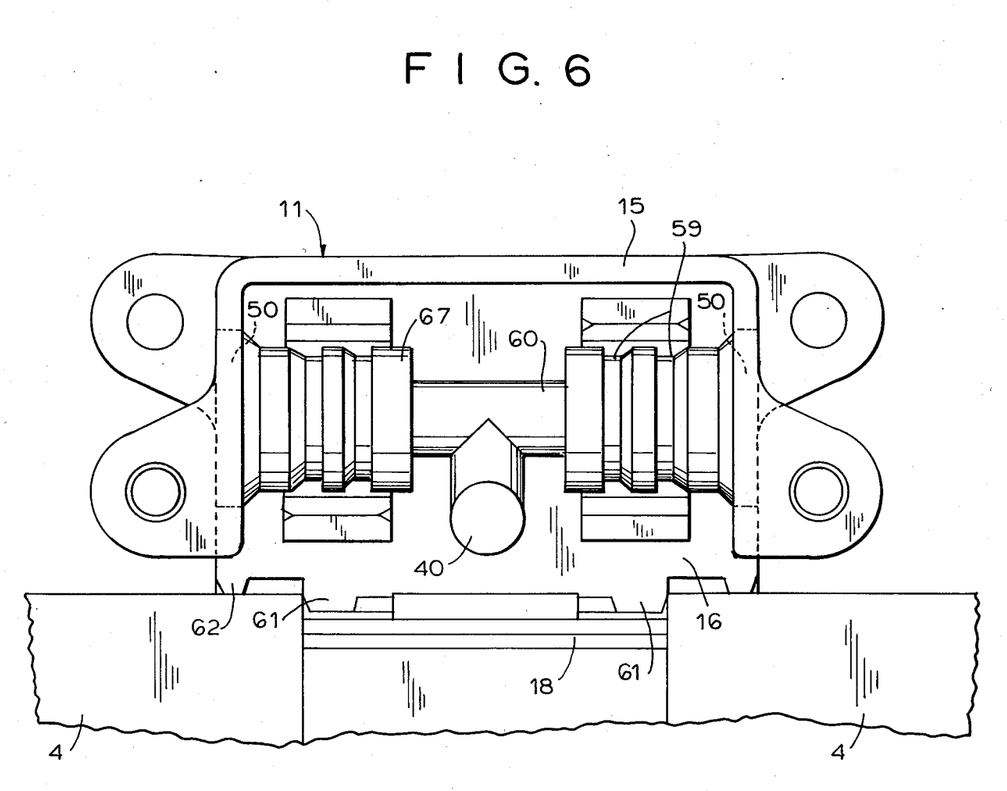
FIG. 6 is a top view of a cut-away part of the socket of the receiver including the lower padding with connection channels leading to suction conduits.

FIG. 6 shows in a plan view a transverse cross-section of a cut-away part of the socket 11 with inserted metal sheating 4 and cable 18. The aluminum outer box 15 of the socket 11 is provided with lower and upper flanges provided with openings for holding the mounting screws and with lateral cutouts for receiving the casing or sheathing 4 with the profiled cable 18. In addition, the aluminum box or shell 15 of the socket 11 is formed with lateral openings 50 for connecting suction conduits. The socket 11 is illustrated with the lower elastic padding 16 only. The padding is formed with semicircular recesses 67 and with a plurality of sealing lips 59 which tightly engage suction pipes 9 and 10 inserted into the lateral openings 50. The bottom connection of the socket 11 with the corresponing suction pipe is established through the bottom opening 40 communicating via the connection channel 60 with the lateral opening 50. The end portions of the profiled metal casings 4 are inserted into the corresponding cutouts in the box 15 to sealingly engage a limit stop 61 in the padding 16. Clamping and sealing lips 62 in the lower padding 16 (and also in the upper padding 17) resiliently hold the metal casing 4 in position.

Figure 7:
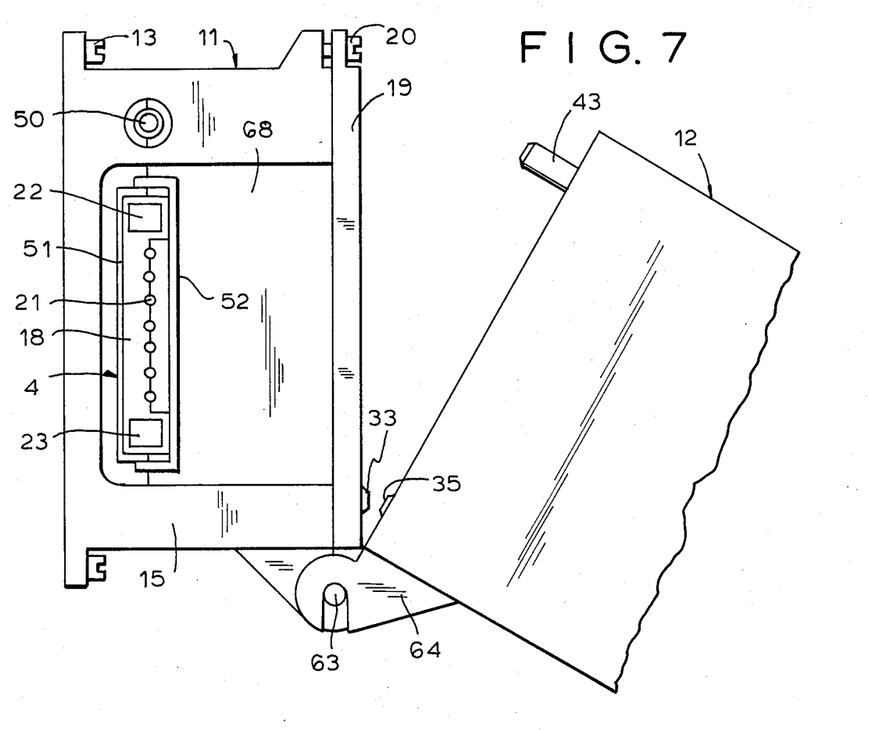
FIG. 7 is a side view of a modification of the measuring receiver provided with a hinge mount shown in a partially swung open position.

FIG. 7 illustrates a hinge mount between the socket 11 and the housing attachment 12. The hinge mount includes a pivot pin 63 formed on the socket 11 and an open hook 64 formed on the housing attachment 12. Upon turning the housing attachment into its closing position, the spring biased flat contacts 33 in socket 11 are pressed against the contact strip 35 of the first modular unit 36 in the housing attachment. Since the contact strip 35 is located close to the hinge 63, the resulting leverage enables to compress by hand the contact elements 33 against the strong biasing force and thereupon the sealing closure between the socket and the housing attachment is secured by the clamping bolt or screw 43. The lateral openings in the socket 11 for inserting the profiled flat cable 18 and the ends of the protective sheathing 4 are indicated by reference numeral 68.

Figure 8:
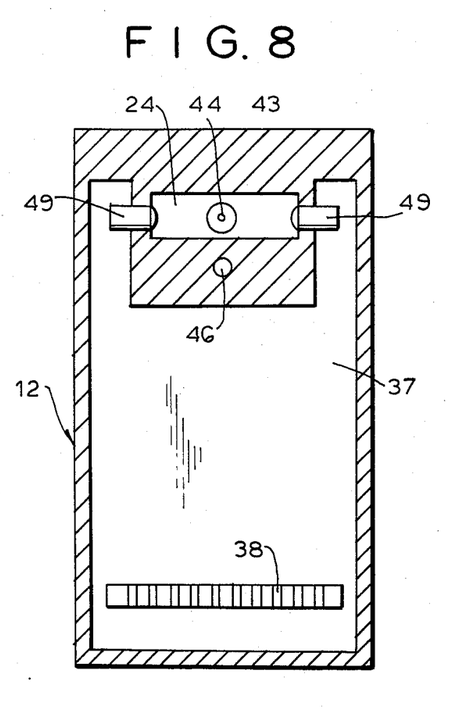
FIG. 8 is a sectional top view of the housing attachment of the receiver shown at the level of the light barrier.

FIG. 8 shows a sectional plan view of the housing part 12 taken at the level of light barrier 49. The housing part 12 has an inner wall portion of increased thickness which is formed with the testing channel 24 and with suction passage 46. The inlet into the testing channel 24 is formed, as described above, by the clamping screw 43 whose axial bore 44 represents the inlet nozzle for the oil mist. The housing part further encloses a compartment for receiving the modular units 36 and 37 with contact strips 38. The modular units include electrical circuits connected to the light barrier.

Figure 9:
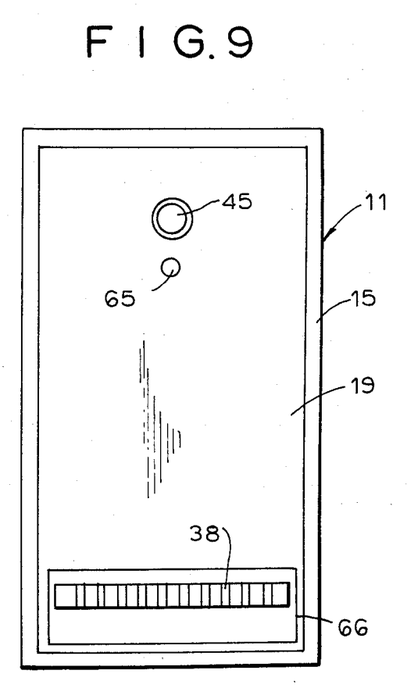
FIG. 9 is an elevation view of a pressure plate of the socket part of the receiver.

FIG. 9 illustrates the top view of the outer shell of box 15 of the socket 11 with attached pressure plate 19. The pressure plate is formed with a threaded opening 45 for engaging the threads of the hollow bolt 43 acting as the inlet nozzle for the oil mist. In addition, the pressure plate is provided with a connection opening 65 for connecting the suction passages 46 and 47, and a rectangular cutout 66 for receiving the flat spring biased contacts 33.

While the invention has been illustrated and described as embodied in a specific example of the lubrication monitoring device, it is not intended to be limited to the details shown, since various modifications and structural changes may be made without departing in any way from the spirit of the present invention Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for monitoring lubrication in driving spaces of an engine having large pistons, particularly a heavy duty diesel engine, comprising a plurality of measuring receivers each having a test channel provided with a light barrier for generating electrical signals indicative of an oil mist concentration in the test channel; suction conduits arranged at a level along said engine and communicating with its driving spaces; a common electrical evaluation unit connected to said receivers by a profiled flat cable to control said engine in response to said electrical signals; said profiled flat cable including a ribbon like intermediate part of an elastic material embedding a set of conductors and two lateral hollow expansions of the same material integral with the intermediate parts and each enclosing an elongated channel extending along said conducters, one of said channels being connected between said suction conduits and a vacuum pump; each of said measuring receivers including a socket formed with openings for receiving said profiled flat cable and said suction conduits, a lower and an upper padding of elastic material arranged in the socket and being formed with suction passages for the oil mist; said lower padding enclosing a portion of said cable and said upper padding embedding a connector block arranged opposite said cable portion, said connector block being provided with electrical contacts for snap engaging said set of conductors and with hollow connection pieces for penetrating said hollow expansions and communicating with said elongated channels; a housing part detachably secured to said socket opposite said upper padding, said housing part enclosing said test channel and said light barrier, a nozzle connecting said test channel with said suction conduit, said suction passage communicating with said test channel and opening into said hollow connection pieces, and means for electrically connecting said light barrier to said connector block.

2. A monitoring device as defined in claim 1, wherein said electrical contacts are fixed in position in said connector block opposite assigned wires of said cable, said electric contacts having a fork shaped configuration to penetrate into the insulation of said wires when the upper padding is pressed against the lower padding and to contact the wires between the arms of the fork; said hollow connection pieces being fixed in position opposite said hollow expansions and being provided with oblique cutting surfaces which during pressing of the upper padding against the lower one penetrate the walls of the hollow expansions and open into said elongated channels, thus automatically making connection between the underpressure elongated channel and the overpressure elongated channel and the testing channel.

3. A monitoring device as defined in claim 1, wherein a plurality of measuring receivers is connected to driving spaces of at least two engines, the measuring receivers at each engine being interconnected by said profiled flat cable and including a terminal box having a configuration of a measuring receiver, the socket of each terminal box including electrical terminals connected to the wires of said flat cable and to a long distance cable leading to said evaluation unit, the housing part of said terminal box including connection pieces communicating with said elongated channels in said hollow expansions and leading to underpressure and overpressure pumps.

4. A monitoring device as defined in claim 1, further comprising a profiled metal sheathing enclosing sections of said profiled flat cable between individual measuring receivers, said metal sheathing including a profiled bottom part and a profiled cover part, the end portions of said metal sheathing being inserted in lateral openings in the sockets of said measuring receivers.

5. A monitoring device as defined in claim 4, wherein said socket includes an outer shell of aluminum and an aluminum pressure plate covering the top of said socket and being fastened to said aluminum outer shell by screws independently from the fastening of said housing attachment, said pressure plate having cutouts for passing through said spring biased flat contacts, and a threaded opening arranged opposite the suction conduit and the testing channel in said housing part to receive a fastening screw for said housing attachment.

6. A monitoring device as defined in claim 4, wherein the hollow expansions of said profiled flat cable are provided with snap locks engaging a locking projections on the inner wall of said cover part of the metal sheathing, and further being provided with inner and outer sealing lips engaging the rim portion of the bottom part of said metal sheathing.

7. A monitoring device as defined in claim 6, wherein said cover and bottom parts of the metal sheathing are compressed against the profiled flat cable before said end portions of the metal sheathing are inserted into the lateral openings in said socket, said lower and upper paddings being provided with clamping recesses in the range of said lateral openings to resiliently clamp said end portions of said metal sheathing to provide a self-supporting and vibration damping suspension for the latter.

8. A monitoring device as defined in claim 1, wherein said connector block is formed with recessed passages communicating with said hollow connection pieces and opening opposite said communication passages in said upper padding, the side of said connector block facing said upper padding being provided with a contact strip electrically connected to said electrical contacts, and the upper padding including an opposite contact strip which upon fastening of said housing attachment to the socket is pressed against the contact strip in said connector block.

9. A monitoring device as defined in claim 8, wherein said upper padding is formed with a suction passage communicating with the recess in said connector block and with a suction passage in said housing attachment.

10. A monitoring device as defined in claim 9, wherein said upper padding is formed with a lateral resilient tongue terminated with a plurality of flat contacts, and further including flexible conductive foils electrially connecting the respective flat contacts to said opposite contact strip, and said electrical socket supporting biasing means urging said flat contacts on said flexible tongue toward said housing attachment.

11. A monitoring device as defined in claim 10, wherein said housing attachment includes a plurality of uniform modular units each having a configuration of a rectangular prism, said modular units being provided with facing contact strips engaging each other, and the contact strip of the first modular unit upon fastening of said housing attachment to said socket being pressed against said spring biased flat contacts.

12. A monitoring device as defined in claim 1, further comprising a pressure plate secured to said circuit by screws, said pressure plate compressing said upper padding against said lower padding to clamp sealingly said profiled flat cable therebetween and to force said contact elements and said hollow connection pieces through the elastic material of said flat cable.

13. A monitoring device as defined in claim 12, wherein said socket includes a bottom wall provided with a connection piece for feeding oil mist from one of said pressure spaces of the engine and further including opposite lateral walls provided with openings communicating with said bottom connection piece to receive suction conduits leading to adjoining pressure spaces, the end portions of said suction conduits and said bottom connection piece being embedded in recesses in said lower padding and being clamped in position by said upper padding.

14. A monitoring device as defined in claim 13, wherein the upper and lower paddings in the range of said lateral openings are provided with recesses for receiving the end portions of said metal sheathing and the end portions of said suction conduit, the recesses being provided with sealing lips hermetically sealing said end portions after said pressure plate is secured to said socket.

15. A monitoring device as defined in claim 14, comprising means for fastening said measuring receivers at the level of said suction conduits, said housing attachment being secured to the pressure plates of said socket by a fastening screw having an axial bore communicating via feeding channels in said lower and upper paddings with said suction conduits and forming a nozzle for feeding the oil mist from said pressure spaces into said testing channel.

16. A monitoring device as defined in claim 15, wherein said testing channel is arranged near one side of said housing attachment, said fastening screw provided with the feeding nozzle being arranged in an opening in said testing channel, the opposite side of said housing attachment being formed with a hook shaped hinge mount linking said socket to said housing part, and said spring biased flat contacts and the corresponding contact sptrips on said modular units being situated close to said hinge mount so as to provide for a leverage which compresses the flat contacts against said contact strip when the housing attachment is turned into its closing position.

17. A monitoring device as defined in claim 16, wherein the fastening screw of said housing attachment is exchangeably arranged in a bottom opening in said testing channel and the nozzle forming axial bore thereof being in alignment with a feeding channel and the connection piece in said socket.

18. A monitoring device as defined in claim 16, wherein an elongated channel in said profiled flat cable is connected to an overpressure pump delivering through said suction passage rinsing air into said testing channel to adjust zero point of said light barrier.

* * * * *